United States Patent [19]

Kojima

[11] 4,023,774
[45] May 17, 1977

[54] ORIFICE UNIT OF A NEEDLE VALVE

[76] Inventor: Hisatoshi Kojima, No. 11-4 Tanabe Amagaike, Tanabe-cho, Tsuzuki, Kyoto, Japan

[22] Filed: Aug. 12, 1975

[21] Appl. No.: 604,042

[30] Foreign Application Priority Data

Aug. 12, 1974 Japan .................... 49-96699[U]

[52] U.S. Cl. .......................... 251/205; 236/102; 251/DIG. 4; 251/362
[51] Int. Cl.² ............................................ F16K 5/12
[58] Field of Search ........... 137/468; 251/205, 362, 251/360, 365, DIG. 4; 138/44, 45, 46; 236/93, 93 R, 102

[56] References Cited
UNITED STATES PATENTS

| 2,610,300 | 9/1952 | Walton et al. | 137/468 X |
| 2,820,473 | 1/1958 | Reiners | 137/468 |
| 2,821,268 | 1/1958 | Bourcier de Carbon | 137/468 X |
| 2,895,500 | 7/1959 | Barnett | 137/468 X |
| 3,330,543 | 7/1967 | Mennesson | 251/DIG. 4 |
| 3,387,830 | 6/1968 | McIlroy | 137/468 X |

Primary Examiner—Harold W. Weakley
Attorney, Agent, or Firm—Wenderoth, Lind & Ponack

[57] ABSTRACT

An orifice assembly includes a cylindrical orifice unit formed of synthetic resin material and having at one end thereof an end wall with an orifice therethrough. A metallic needle is mounted for reciprocation in the orifice. The needle has an oblique surface which defines with the surface of the orifice a gap which is variable with reciprocation of the needle. A holder element, preferably of metal, surrounds and supports the orifice unit. An annular recess is provided, preferably in the outer surface of the orifice, radially outwardly of the orifice to allow expansion and contraction of the resin material, due to temperature variations, without constraint.

2 Claims, 8 Drawing Figures

ORIFICE UNIT OF A NEEDLE VALVE

BACKGROUND OF THE INVENTION

This invention relates to an improved orifice unit assembly for use as a needle valve flow meter provided in a gas or liquid system.

Orifice valve assemblies are known which include a metalic orifice holder element, a synthetic resin material orifice unit fitting tightly within the holder element and having an end wall at one end thereof, and a metallic tapered or bevel-ended needle reciprocable through the orifice, whereby the tapered needle will regulate the amount of fluid flow through the orifice.

However, such known assemblies suffer from the disadvantages that variations in temperature cause the rate of expansion and contraction of the resin material orifice unit to be greater than that of the metallic holder unit and needle, and that such temperature variations result in variations in the viscous resistance of gas. Therefore, it is difficult to maintain a constant flow rate through the orifice.

SUMMARY OF THE INVENTION

With the above discussion in mind, it is the object of the present invention to provide an orifice assembly wherein it is possible to maintain a constant flow rate, even with temperature variations.

This object is achieved in accordance with the present invention by providing a hollow space or annular recess radially outwardly of the orifice between the synthetic resin material and the metallic material.

BRIEF DESCRIPTION OF THE DRAWINGS

The advantages and features of the present invention will be more clearly understood from the following detailed description taken in connection with the accompanying drawings, in which.

DETAILED DESCRIPTION OF THE INVENTION

Figure 1:
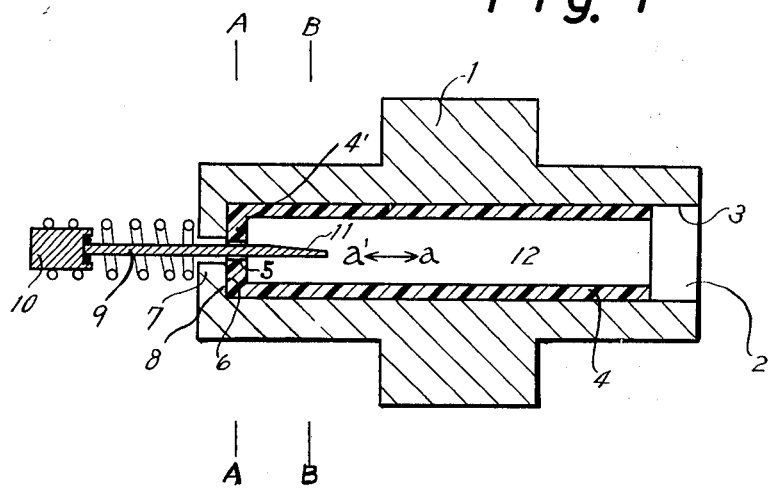
FIG. 1 is an axial section of a conventional orifice assembly.
Figure 2:
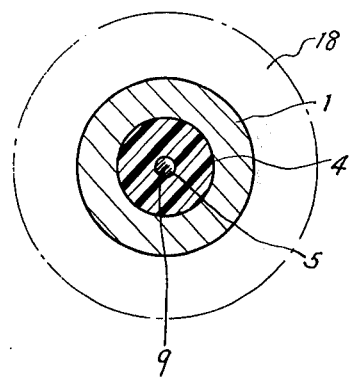
FIGS. 2 and 3 are cross sectional views along the lines A—A and B—B, respectively, in FIG. 1.
Figure 3:
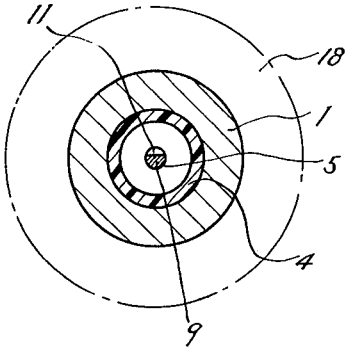

In FIG. 1, which shows a sectional view of a conventional orifice assembly, an orifice unit 4 of synthetic resin material is disposed with the outer surface thereof contiguous to the inner wall surface 3 of a longitudinal passage 2 extending coaxial to the center axis of a metallic orifice holder element 1. One end portion of orifice unit 4 has a narrowed and restricted inner diameter to form an orifice plate 4' having extending therethrough an orifice 5. The end surface 6 of plate 4' is disposed to contact the surface 8 of narrowed end wall 7 of orific unit 4. The base portion 10 of a metallic needle 9 is connected with a suitable moving device (not shown in the drawings) which is reciprocally movable in the directions ($a \leftrightarrow a'$) along the center axis of the orifice holder element, so that the needle 9 is also reciprocally movable in the directions $a \leftrightarrow a'$, with the outer surface of the needle 9 in contact with the inner surface of orifice 5. The end portion of the needle 9 is cut obliquely as at 11.

Figure 4:
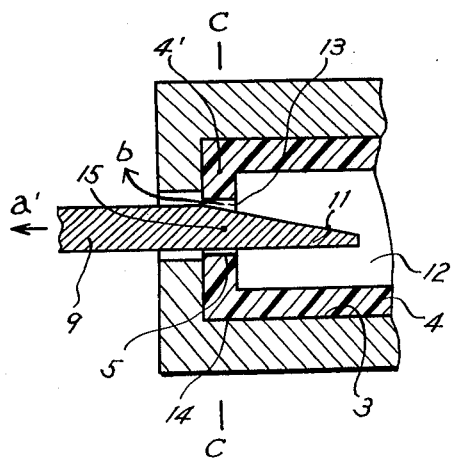
FIG. 4 is a sectional view of a conventional orifice assembly, enlarged for better illustration of the operation thereof.
Figure 5:
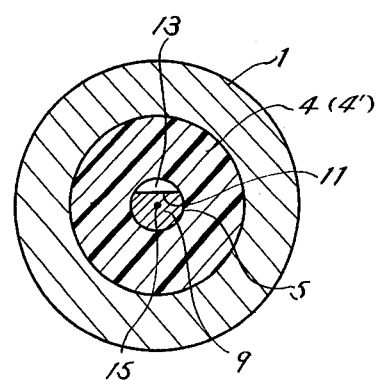
FIG. 5 is a cross sectional view along the line C—C in FIG. 4.

In conventional orifice assemblies as described above, if the needle 9 be caused to move in the direction of arrow $a'$ to bring the slanted surface 11 to a position where it is just adjacent the inner surface or orifice 5, fluid will be permitted to flow from the inner space 12 of the orifice unit 4 through the gap 13 between the inner surface of orifice 5 and the slanted surface 11 of the needle, in the direction of arrow $b$, as seen in FIG. 4, a sectional view along the line $c-c$ of FIG. 4 being seen in FIG. 5. If the needle 9 is further shifted in the direction of $a'$, the flow rate in the direction of the arrow $b$ will be increased as the size of the gap 13 is increased. Accordingly, the flow rate of the fluid in the direction of arrow $b$ may be controlled in accordance with the amount of movement of the needle 9 in the direction of $a'$. It is very important that the width of the gap 13 be kept precisely at a predetermined amount, no matter what the temperature. However, in conventional orifice assemblies, a temperature variations does in fact influence the size of gap 13, and thus the rate of flow of fluid in direction $b$, in the following manner.

The orifice unit 4 is made of a synthetic resin having a large coefficient of thermal expansion, and the needle 9 and the orifice holder element made of metallic material having a smaller coefficient of thermal expansion than that of unit 4. Since the inner and outer peripheral surfaces 5 and 14 of the end wall 4' are contiguous with the external surface of the needle 9 and with the inner wall surface 3 of the orifice holder element 1, respectively, when the temperature is raised, the volume of the orifice unit 4 will expand by a greater amount than the orifice holder element 1 and the needle 9. Since the outer peripheral surface of the orifice unit 4 is tightly fitted into the orifice holder element 1 when the orifice unit 4 is thermally expanded, the end plate 4' would tend to be thermally expanded radially outwards towards orifice holder element 1. However, such expansion is prevented by the inner wall of the orifice holder element 1. Thus, the incremental volume increase of the orifice unit 4 due to the expansion of the material thereof will be forced to take place in a radially inner direction toward the central axis 15 of the needle. The gap 13 between the oblique surface 11 of the needle and the orifice surface 5 would therefore become narrower than that set at a normal temperature value (e.g., 15° C, as a rule.)

Also, at a lower temperature, the volume change of orifice unit 4 due to thermal contraction would be greater than that of the orifice holder element and needle. Thud, the gap 13 would again become smaller than the set value.

Additionally, it is to be noted an important factor is that the viscous resistance of gas is variable in accordance with the variation of the gas temperature. Gases would have a variety of viscous resistances with respect to the temperature of the gas, but, generally speaking, if the temperature is higher than the set temperature, the viscous resistance of the gas will be increased, but if the temperature is lower, the viscous resistance of the gas will be decreased.

Accordingly, when considering the temperature effect on the flow rate at the gap 13 at a set temperature of an orifice assembly of conventional construction, if the temperature becomes higher, the gap 13 would become smaller as discussed above, the viscous resistance would be increased, and the flow rate would accordingly be decreased. However, if the temperature becomes lower, the gap 13 would also be decreased as discussed above, but the viscous resistance would be decreased, and the flow rate would accordingly be increased. Thus, the conventional structure will produce great variations of flow rate upon variations in temperature.

Figure 6:
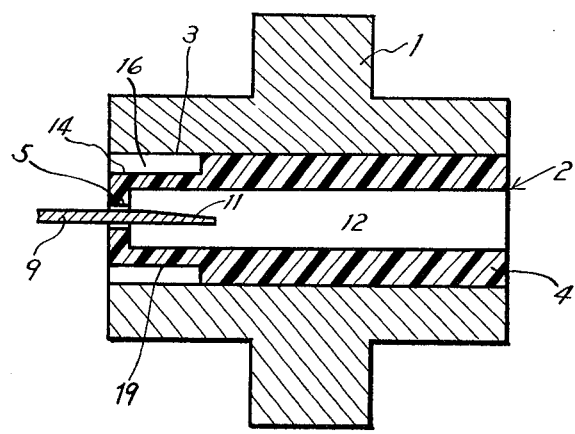
FIG. 6 is a sectional view of an orifice assembly according to the present invention.

However, as may be seen in FIG. 6, wherein there is shown a schematic sectional view of an orifice assembly according to the invention, a hollow space 16 is provided between inner wall surface 3 of the passage 2 of the orifice holder element 1 and the peripheral surface 14 of the orifice unit 4. Hollow space 16 compensates for the expansion and contraction of the orifice unit due to temperature variations, as well as for variations of viscous resistance of gas due to temperature variations.

That is to say, the hollow space 16 is produced, as may be seen in FIG. 6, by making the outer diameter of the orifice unit 4 in the vicinity of the end wall 4' smaller than the diameter of the inner wall surface 3 of the passage 2 of the orifice holder element.

The following will explain why the structure of the invention eliminates the inconveniences of conventional assemblies. Considering that the flow rate is estaglished at a certain value at a certain temperature, when this temperature is increased wall 4' of the orifice unit 4 will be allowed to expand outwardly towards the orifice holder element 1, due to the provision of space 16. Thus, both the external and internal diameters of unit 4 will be allowed to expand. However, the temperature is increased, the viscous resistance of the gas would also be increased such that if gap 13 remained constant the flow rate would be decreased. However, as stated above, at a higher temperature, the gap 13 would be increased due to thermal expansion. Thus, the effect from thermal expansion on the flow rate may be related or balanced with the effect from the variation of the viscous resistance to produce a compensation therebetween to maintain a constant flow rate through gap 13. If the temperature is lowered, the wall 4' of the orifice unit 4 will contract towards the center 15 of the needle, so that both the inner and outer diameters would be decreased. The viscous resistance of the gas will, however, be decreased at a higher temperature, such that the flow rate would be increased if the gap 13 remained constant. However, since as stated above the gap 13 is decreased due to contraction at the lower temperature, the effect from such thermal contraction on the flow rate may be related or balanced with the effect from the variation of the viscous resistance to maintain a constant flow rate through gap 13.

Thus, according to this invention, the variation of viscous resistance of gas due to temperature variation is balanced with volume change of the orifice unit due to temperature variation, which is allowed due to the provision of space 16, to insure that the flow rate through gap 13 is kept constant, even with temperature variations.

Further, in lieu of the recess 16 in unit 4, there may be provided a hollow space 16' (shown in dashed lines in FIG. 1) between the peripheral surface 17 of the orifice holder element, in the vicinity thereof of the orifice 5, and support means 18, with orifice holder element 1 as well as orifice unit 4 being formed of a synthetic material. This embodiment is also effective to provide a constant flow rate through a gap 13 even with temperature variations.

Figure 7:
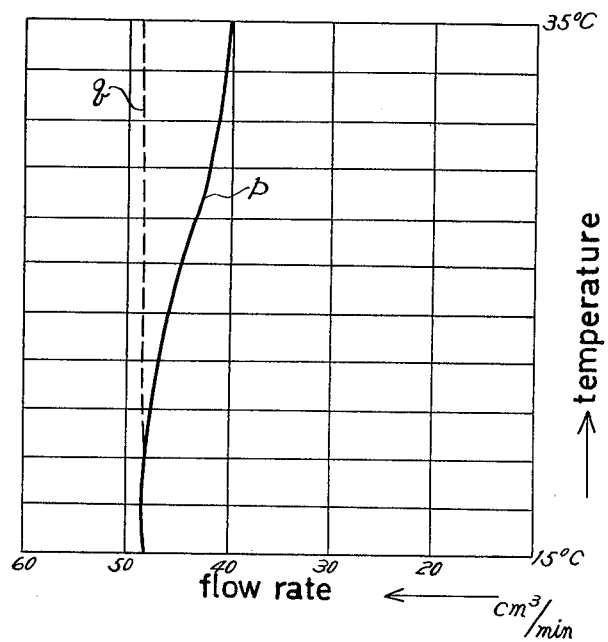
FIG. 7 is a graph showing temperature versus flow rate characteristics of conventional orifices and those of the invention.
Figure 8:
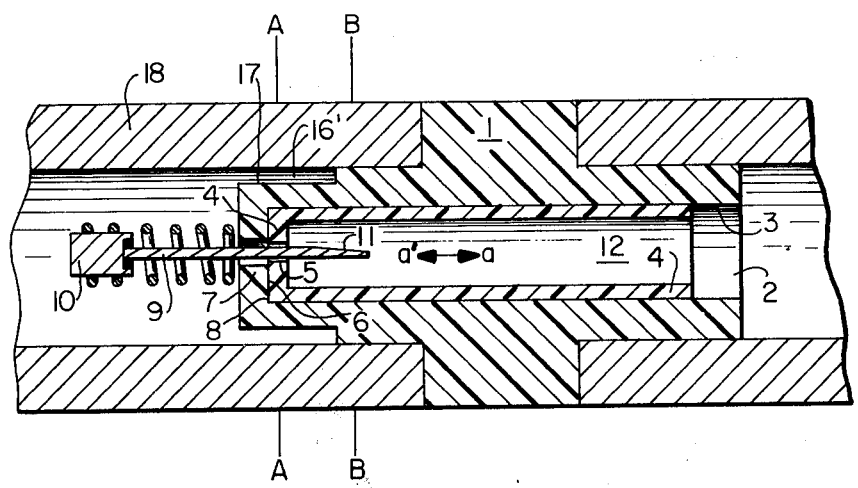

FIG. 7 is a graph, with temperature (°C) on the ordinate and flow rate (cm³/min) on the abscissa, illustrating temperature versus flow rate variations, wherein the solid line shows variation in an orifice assembly of conventional design, and the broken line shows a characteristic obtained from practical measurements of an orifice assembly according to this invention. The superiority of the present invention will be apparent. The invention may be applied with advantage in a wide variety of industrial uses, for example, as a gas flow rate controller, as a general gas analizer, as a device for maintaining the flow rate of a fluid at a predetermined mass flow, or for similar purposes.

Modifications may be made to the specific structural arrangement described above without departing from from the scope of the present invention.

What I claim is:

1. An orifice valve assembly comprising: a cylindrical orifice unit formed of synthetic resin material and having at one end thereof an end wall with an orifice therethrough, said end wall being of substantially uniform thickness in the axial direction of said orifice unit;
    a metallic needle mounted for reciprocation in said orifice, said needle having a cylindrical surface portion in contact with an inner surface of said end wall defining said orifice, said needle having an oblique surface portion defining with said inner surface of said end wall a gap which is variable with reciprocable movement of said needle; and
    a metallic holder element having a passage therethrough, said orifice unit being positioned within said passage, said orifice unit having a greater diameter outer portion in contiguous contact with an inner surface of said holder element defining said passage, said orifice unit having a smaller diameter outer portion, formed integrally with said larger diameter outer portion, at a position radially outwardly of said orifice, spaced from said inner surface of said holder element, and said smaller diameter outer portion forming recess means for allowing unconstrained radial expansion and contraction of said end wall due to temperature variations.

2. An orifice valve assembly comprising:
    a cylindrical orifice unit formed of synthetic resin material and having at one end thereof an end wall with an orifice therethrough, said end wall being of substantially uniform thickness in the axial direction of said orifice unit;
    a metallic needle mounted for reciprocation in said orifice, said needle having a cylindrical surface portion in contact with an inner surface of said end wall defining said orifice, said needle having an oblique surface portion defining with said inner surface of said end wall a gap which is variable with reciprocable movement of said needle; and
    a holder element formed of synthetic resin material and having a passage therethrough, said orifice unit having an outer surface in contiguous contact with an inner surface of said holder element defining said passage, said holder element having a greater diameter outer portion in contiguous contact with a support means, said holder element having a smaller diameter outer portion, formed integrally wih said larger diameter outer portion, at a position radially outwardly of said orifice, spaced form said support means, and said smaller diameter outer portion forming recess means for allowing unconstrained radial expansion and contraction of said end wall due to temperature variations.

* * * * *